(12) United States Patent  
Johnson

(10) Patent No.: US 7,708,025 B2
(45) Date of Patent: May 4, 2010

(54) POPPET VALVE MEMBER

(75) Inventor: Robert K. Johnson, Blaine, MN (US)

(73) Assignee: Colder Products Company, St. Paul, MN (US)

( * ) Notice: Subject to any disclaimer, the term of this patent is extended or adjusted under 35 U.S.C. 154(b) by 57 days.

(21) Appl. No.: 11/276,591

(22) Filed: Mar. 7, 2006

(65) Prior Publication Data
US 2006/0196556 A1    Sep. 7, 2006

Related U.S. Application Data

(60) Provisional application No. 60/659,591, filed on Mar. 7, 2005.

(51) Int. Cl.
F16K 17/14 (2006.01)

(52) U.S. Cl. .................. 137/316; 137/68.11; 137/377; 137/797; 222/641.1; 222/541.6; 222/541.9; 251/89; 251/90; 251/91

(58) Field of Classification Search ............. 137/542, 137/68.11, 797, 316, 377; 251/89, 90, 91; 222/541.1, 541.6, 541.9, 153.05, 153.06
See application file for complete search history.

(56) References Cited

U.S. PATENT DOCUMENTS

| 2,503,349 | A |   | 4/1950  | Mitchell           |         |
|-----------|---|---|---------|--------------------|---------|
| 3,415,299 | A |   | 12/1968 | Hinman, Jr. et al. |         |
| 3,450,424 | A |   | 6/1969  | Calisher et al.    |         |
| 3,794,098 | A | * | 2/1974  | Versen ............ | 152/428 |
| 3,913,615 | A |   | 10/1975 | Cooper             |         |
| 3,945,540 | A | * | 3/1976  | Mantchev .......... | 222/525 |
| 3,994,317 | A |   | 11/1976 | Miyazaki et al.    |         |
| 4,137,930 | A |   | 2/1979  | Scholle            |         |
| 4,182,370 | A |   | 1/1980  | Karcher            |         |
| 4,418,716 | A |   | 12/1983 | Starke             |         |
| 4,447,040 | A |   | 5/1984  | Magorien           |         |
| 4,538,658 | A |   | 9/1985  | Earley             |         |
| 4,613,112 | A |   | 9/1986  | Philipot et al.    |         |
| 4,679,618 | A |   | 7/1987  | Farkas             |         |
| 4,773,571 | A | * | 9/1988  | Hagan et al. ...... | 222/394 |
| 4,880,029 | A |   | 11/1989 | Koller             |         |

(Continued)

FOREIGN PATENT DOCUMENTS

DE        1 115 540        1/1957

(Continued)

Primary Examiner—John Rivell
Assistant Examiner—William McCalister
(74) Attorney, Agent, or Firm—Merchant & Gould P.C.

(57) ABSTRACT

A poppet valve member includes a main body, and a cover portion disposed at the first end of the valve member. The cover portion is removable from the main body, the cover portion including a first seal disposed about an outer perimeter of the cover portion. The valve member includes a head portion disposed proximate the first end and behind the cover portion, the head portion including a second seal disposed about an outer perimeter defined by the head portion. A webbing portion is disposed between the cover portion and the head portion, the webbing portion including a fault structure to enable the cover portion to be removed from the main body and broken off from the head portion. The main body is formed of a molded material, and the first and second seals are formed of an overmold material molded onto the main body.

15 Claims, 8 Drawing Sheets

U.S. PATENT DOCUMENTS

| | | | |
|---|---|---|---|
| 4,892,117 A | 1/1990 | Spalink et al. | |
| 4,903,942 A | 2/1990 | Licciardello et al. | |
| 4,946,455 A | 8/1990 | Rosen | |
| 4,979,721 A | 12/1990 | Gilbert | |
| 5,052,725 A | 10/1991 | Meyer et al. | |
| 5,072,756 A | 12/1991 | Carr | |
| 5,090,747 A | 2/1992 | Kotake | |
| 5,104,158 A | 4/1992 | Meyer et al. | |
| 5,193,579 A | 3/1993 | Bauer et al. | |
| 5,215,122 A | 6/1993 | Rogers et al. | |
| 5,255,713 A | 10/1993 | Scholle et al. | |
| 5,255,804 A * | 10/1993 | Butterbrodt | 604/111 |
| 5,271,429 A | 12/1993 | Bauer et al. | |
| 5,316,041 A | 5/1994 | Ramacier, Jr. et al. | |
| 5,381,836 A | 1/1995 | Braatz et al. | |
| 5,406,980 A | 4/1995 | Allread et al. | |
| 5,452,736 A | 9/1995 | Arosio | |
| 5,533,548 A | 7/1996 | Grant | |
| 5,555,908 A | 9/1996 | Edwards et al. | |
| 5,911,403 A * | 6/1999 | deCler et al. | 251/149.6 |
| 5,975,489 A | 11/1999 | deCler et al. | |
| 6,609,454 B2 * | 8/2003 | Frost | 92/212 |
| 6,978,800 B2 | 12/2005 | deCler et al. | |
| 2005/0028873 A1 * | 2/2005 | Martin et al. | 137/592 |

FOREIGN PATENT DOCUMENTS

| | | |
|---|---|---|
| DE | 1 298 378 | 6/1969 |
| DE | 198 09 989 A1 | 9/1999 |
| GB | 756608 | 9/1956 |
| GB | 1 359 859 | 7/1974 |
| GB | 2 140 132 A | 11/1984 |

* cited by examiner

POPPET VALVE MEMBER

RELATED APPLICATION

This application claims the benefit under 35 U.S.C. § 119 (e) of U.S. Patent Provisional Application Ser. No. 60/659,591 filed on Mar. 7, 2005, the entirety of which is hereby incorporated by reference.

TECHNICAL FIELD

Embodiments disclosed herein relate to poppet valve members used in coupling devices.

BACKGROUND

The use of a poppet valve in coupling devices is well known. In particular, poppet valves have been used in coupling devices for various fluid dispensing applications, such as food and liquid dispensing. Typically, these poppet valves are actuatable so as to enable/disable flow through a flow passage in a coupling. Oftentimes, such coupling devices require a sealing and covering at one end of the poppet valve. This is desired so that tampering of the coupling is prevented before a desired time of use.

While these poppet valve configurations are suitable for their applications, improvements can be made. For example, tear off foil seals are typically heat staked through a melt reaction at an end of the insert of the coupling. These foil seals, however, do not provide the durability that can be required during transport or other challenging environmental conditions in which the coupling device can be compromised. Such a structure can be inadvertently punctured or ripped off the coupling end. Further, if an adhesive is used, it may not provide a sufficient seal even if the foil is not punctured or ripped.

In other examples, separately molded cap structures can be affixed by an interference or snap fit at an end of the insert. These caps, however, may not provide sufficient interference contact to maintain the necessary seal before use. Further, if such caps employ additional sealing features, such seals are produced so as to be integral to the cover. These caps can be more expensive to produce, and the seals used can experience degradation, which is not desired.

In the foregoing examples and the like, further deficiencies result from a manufacturing standpoint where fewer parts are desired, especially in high volume production of disposable fluid couplings. There is variable cost for producing the separate foils and/or separately molded caps that remain with production. The existence of additional cap parts further requires a longer and more complex assembly.

SUMMARY

Embodiments disclosed herein relate to poppet valve members used in coupling devices.

According to one aspect, a poppet valve member includes an main body defining a first end and a second end, a cover portion disposed at the first end, the cover portion being removable from the main body, the cover portion including a first seal disposed about an outer perimeter defined by the cover portion, and a head portion disposed proximate the first end and behind the cover portion, the head portion including a second seal disposed about an outer perimeter defined by the head portion. The poppet valve member also includes a webbing portion disposed between the cover portion and the head portion, the webbing portion defining a fault structure so as to enable the cover portion to be removed from the head portion.

According to another aspect, an insert for a coupling device includes an insert body defining a first circumferential insert end, an internal diameter defining a flow passage therethrough, and a shoulder formed in the internal diameter of the flow passage, and a spring located in the insert body. The insert also includes a poppet valve member axially moveable within the insert body by a spring, the poppet valve member including an main body defining a first end and a second end, a cover portion disposed at the first end, the cover portion being removable from the main body, the cover portion including a first seal disposed about an outer perimeter defined by the cover portion and sized to engage the first circumferential insert end, and a head portion disposed proximate the first end and behind the cover portion, the head portion including a second seal disposed about an outer perimeter defined by the head portion and sized to engage a shoulder formed in the internal diameter of the flow passage of the insert. The poppet valve member also includes a webbing portion disposed between the cover portion and the head portion, the webbing portion defining a fault structure so as to enable the cover portion to be removed from the main body.

According to yet another aspect, a method of forming a poppet valve member for an insert includes: molding a main body including a cover portion and a head portion, the cover portion being coupled to the head portion by a web portion, the webbing portion defining a fault structure so as to enable the cover portion to be removed from the head portion; and thereafter, overmolding first and second seals on the main body, the first seal being disposed about an outer perimeter defined by the cover portion, and the second seal being disposed about an outer perimeter defined by the head portion.

These and other various advantages and features of novelty are pointed out in the following detailed description. Reference should also be made to the drawings in which there are illustrated and described specific embodiments.

DESCRIPTION OF THE DRAWINGS

Like reference numbers generally indicate corresponding elements in the figures.

DETAILED DESCRIPTION

Figure 1:
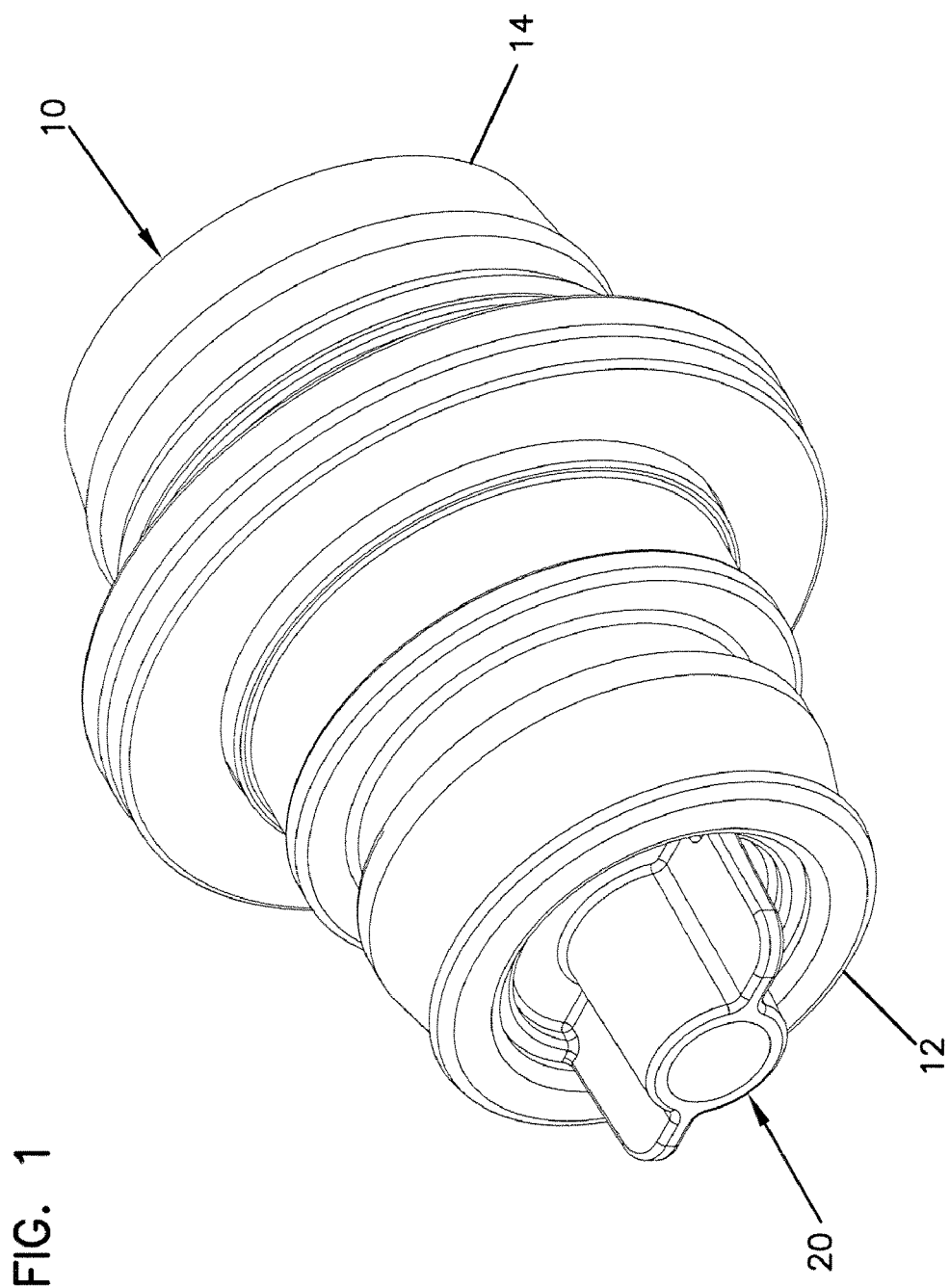
FIG. 1 represents an elevational perspective view of a coupler insert having one embodiment of a poppet valve member incorporated therein.

One embodiment of a poppet valve member 20 is provided in FIGS. 1A-4. FIGS. 1A-2B illustrate a coupler insert 10 having the poppet valve member 20 incorporated therein. The insert 10 includes ends 12, 14 and a flow passage therethrough (shown in FIG. 2A). One end 12 can be configured so as to be insertable into another coupling member such as any quick connect/disconnect coupling well known in the art. The other end 14 can be formed as a fitment structure so as to be connectable to another piece of fluid dispensing equipment, such as a fluid source or other fluid connector. As one example configuration, the fitment at end 14 can be a barbed or threaded end. It will be appreciated the fitment may be other suitable configurations known in the art. Inserts for coupling devices, namely quick connect/disconnect couplers, are well known.

Figure 3A:
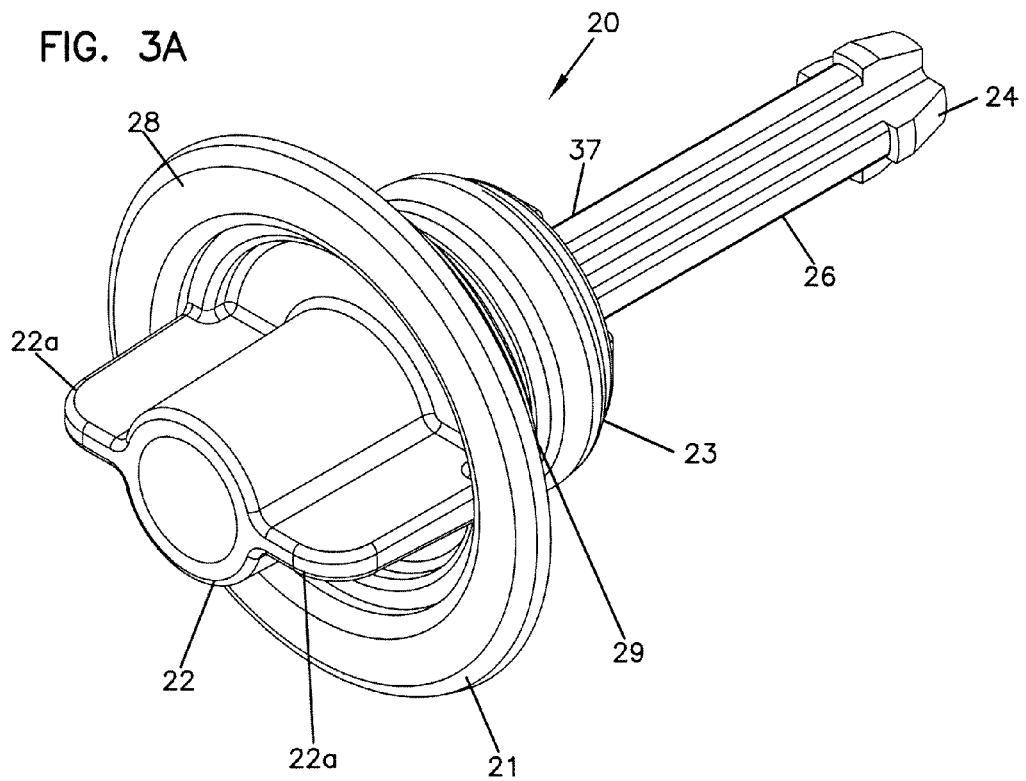
FIG. 3A represents an elevational perspective view of the poppet valve member illustrated in FIG. 1.
Figure 3B:
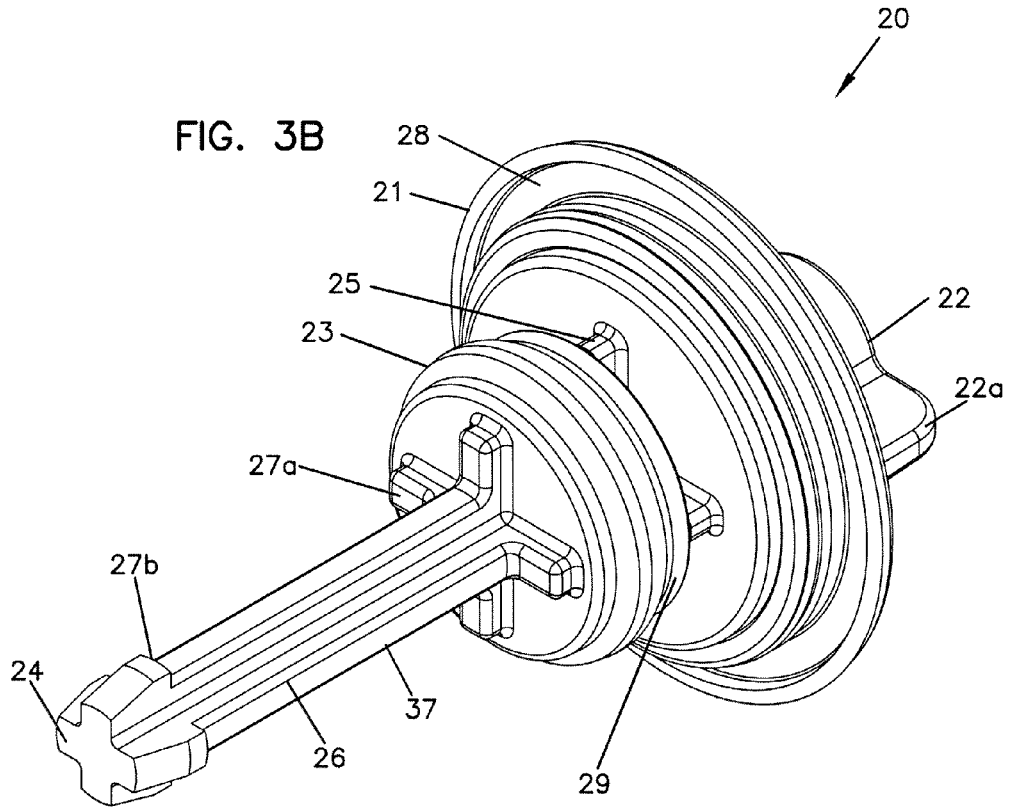
FIG. 3B represents an elevational perspective view of the poppet valve member illustrated in FIG. 3A.
Figure 4:
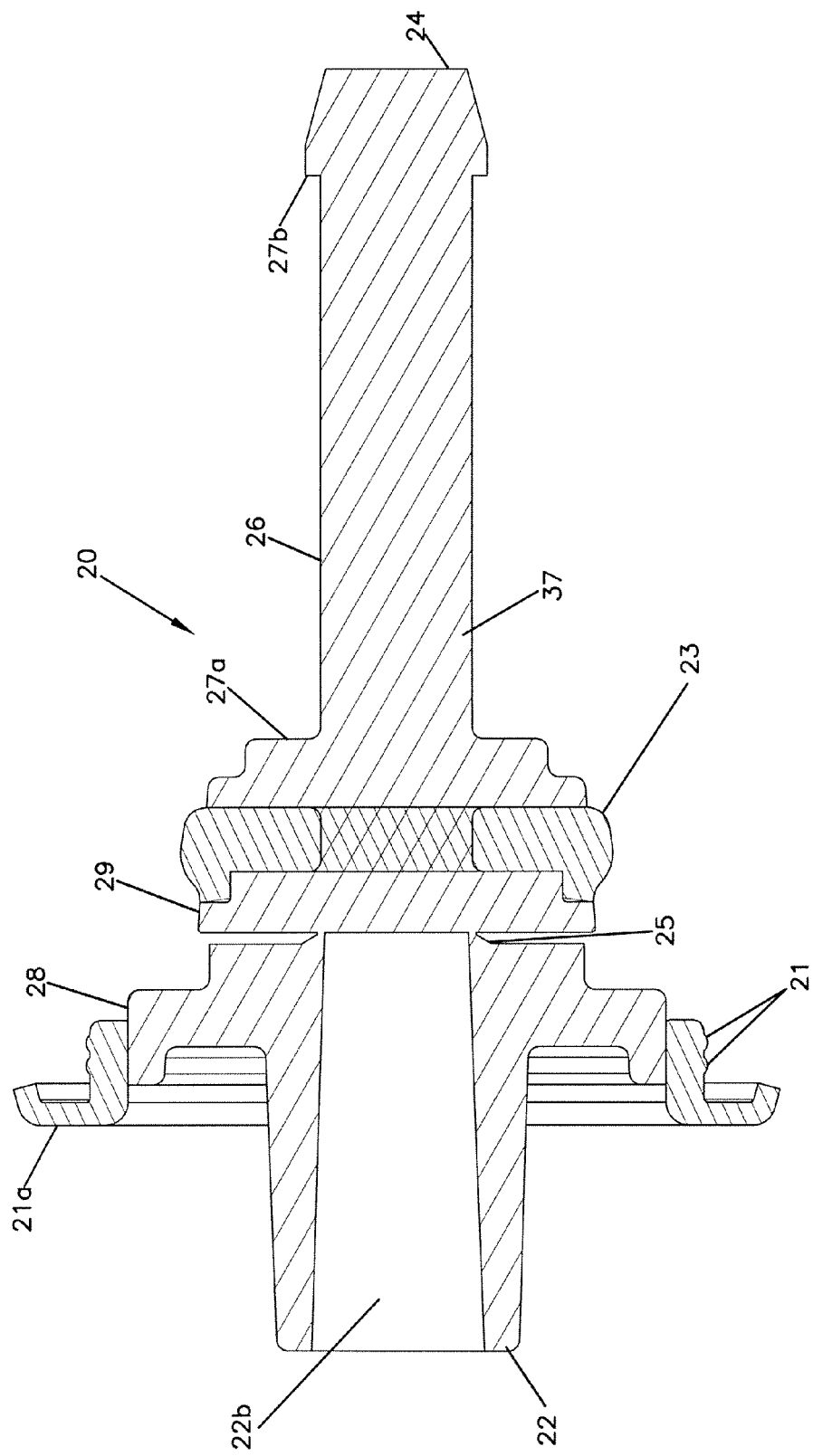
FIG. 4 represents sectional side view of the poppet valve member of FIG. 3A.
Figure 5A:
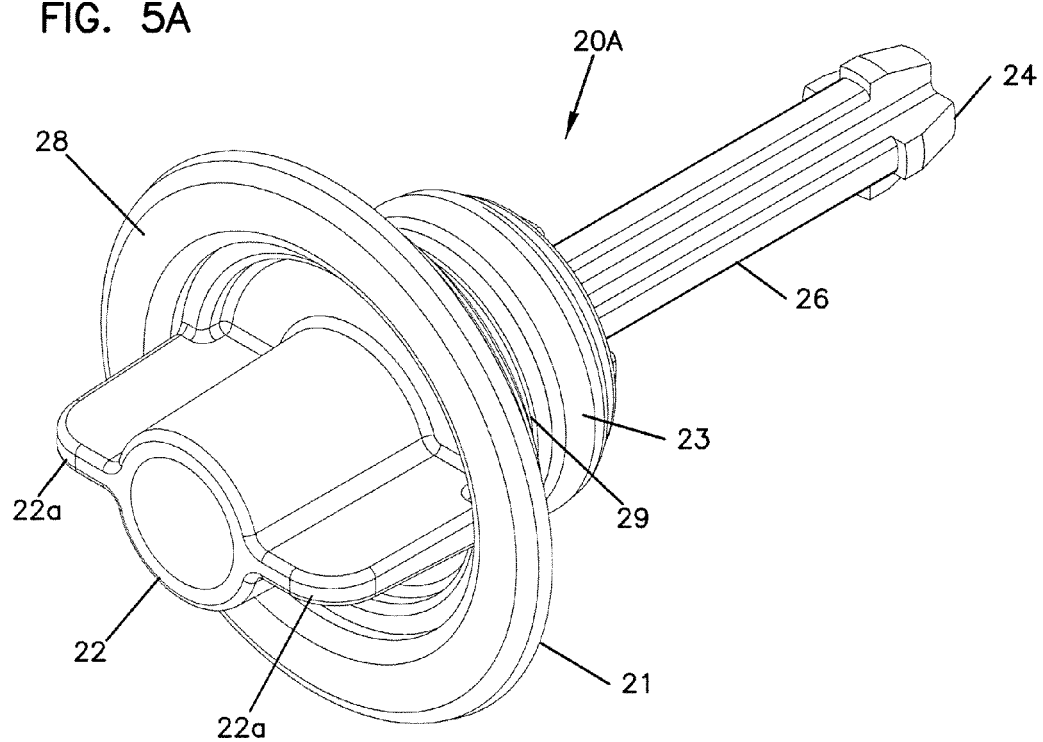
FIG. 5A represents an elevational perspective view of a second embodiment of a poppet valve member.
Figure 5B:
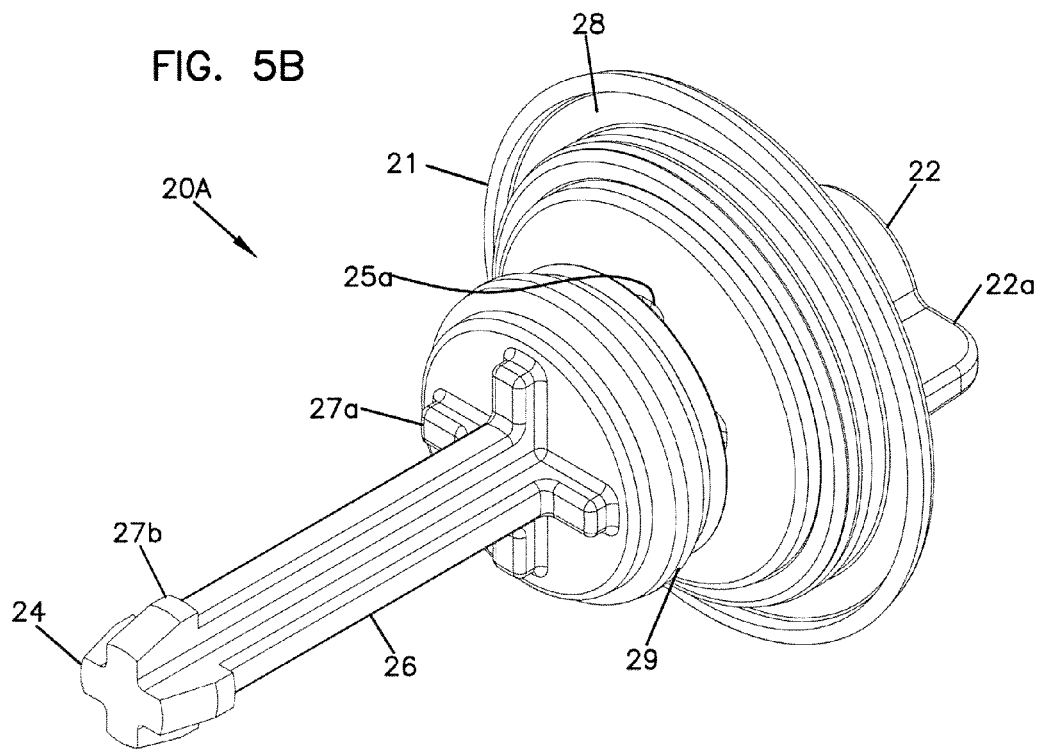
FIG. 5B represents an elevational perspective view of the second embodiment of the poppet valve member of FIG. 5A.
Figure 6:
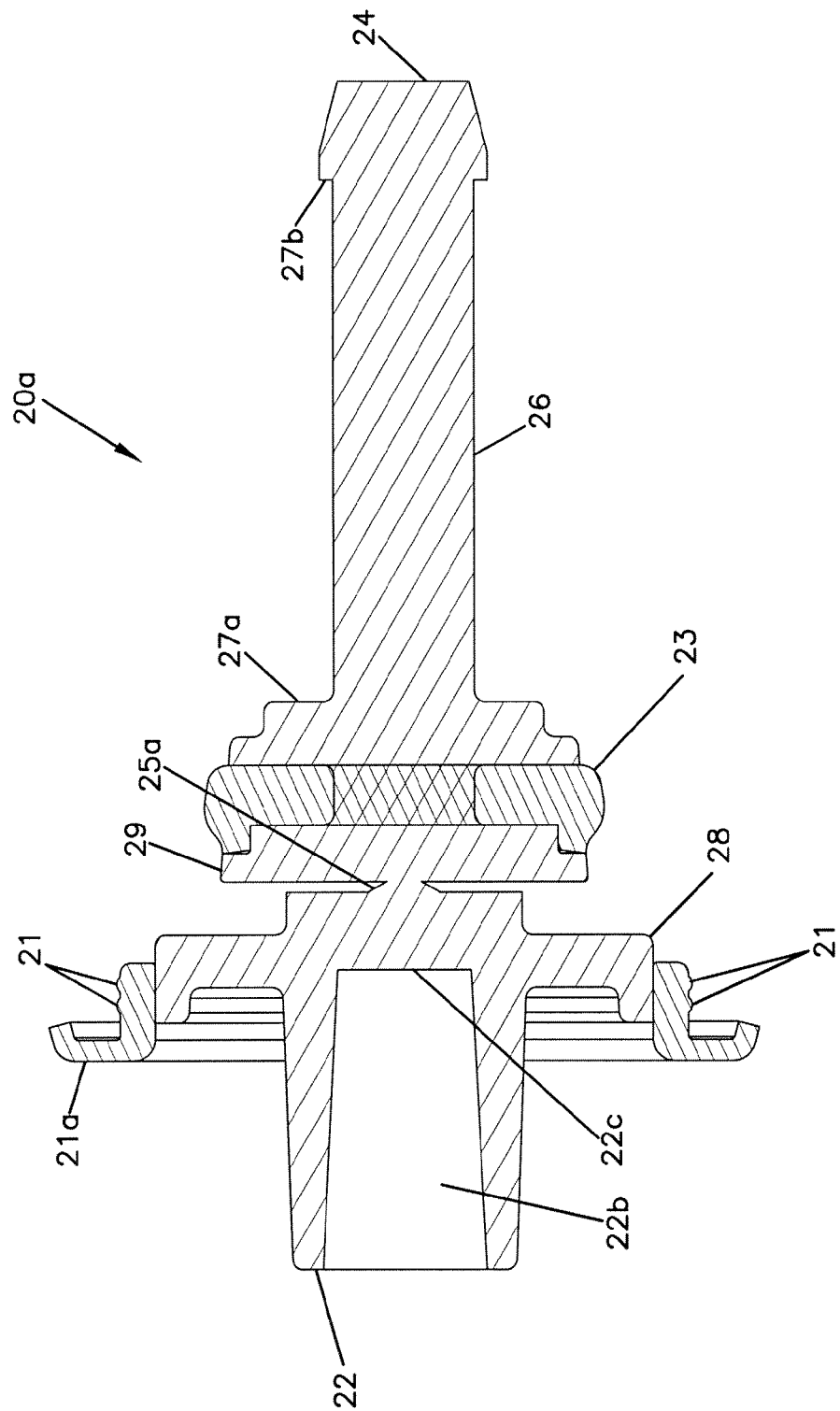
FIG. 6 represents a sectional side view of the poppet valve member of FIG. 5A.

FIGS. 3A, 3B, and 4 illustrate the poppet valve member 20. The poppet valve member 20 includes a main body 37 having a first end 22 and a second end 24. The first end 22 includes a removable cover portion 28. The main body 37 is substantially defined by the head portion 29 and elongated body 26.

The removable cover portion 28 includes a first seal 21 disposed about the outer perimeter or circumference of the cover portion 28. In the example shown, the first seal 21 provides an overlap seal 21a about the perimeter or circumference of the end 12 of the insert 10. This is best shown in FIG. 2B. In one embodiment, the first seal 21 resides inside a circumferential wall defined at end 12 of the insert 10, and extends so as to wrap around and overlap the circumferential wall at the end 12. The cover portion 28 with the first seal 21 and overlap 21a provide a suitable seal at the end 12 during transport and before desired use of a coupling insert.

It will be appreciated that the circumference geometries may be varied as desired with respect to the removable cover portion and insert used, and may be easily adapted so as to be configured of geometries other than an insert with a cylindrical shaped flow path and circular cover.

Figure 2A:
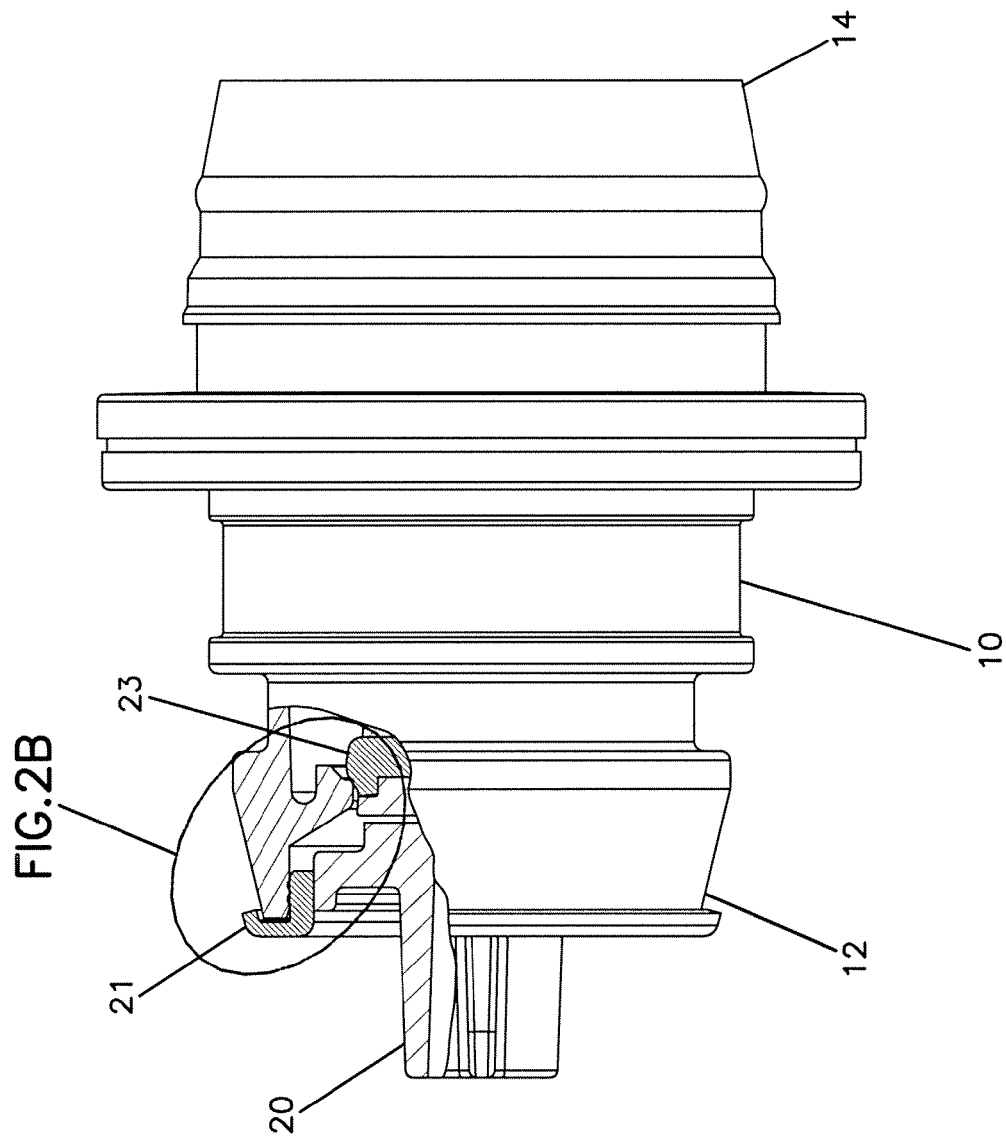
FIG. 2A represents an elevational side view of the insert and the poppet valve member of FIG. 1 and showing a partial sectional view thereof.
Figure 2B:
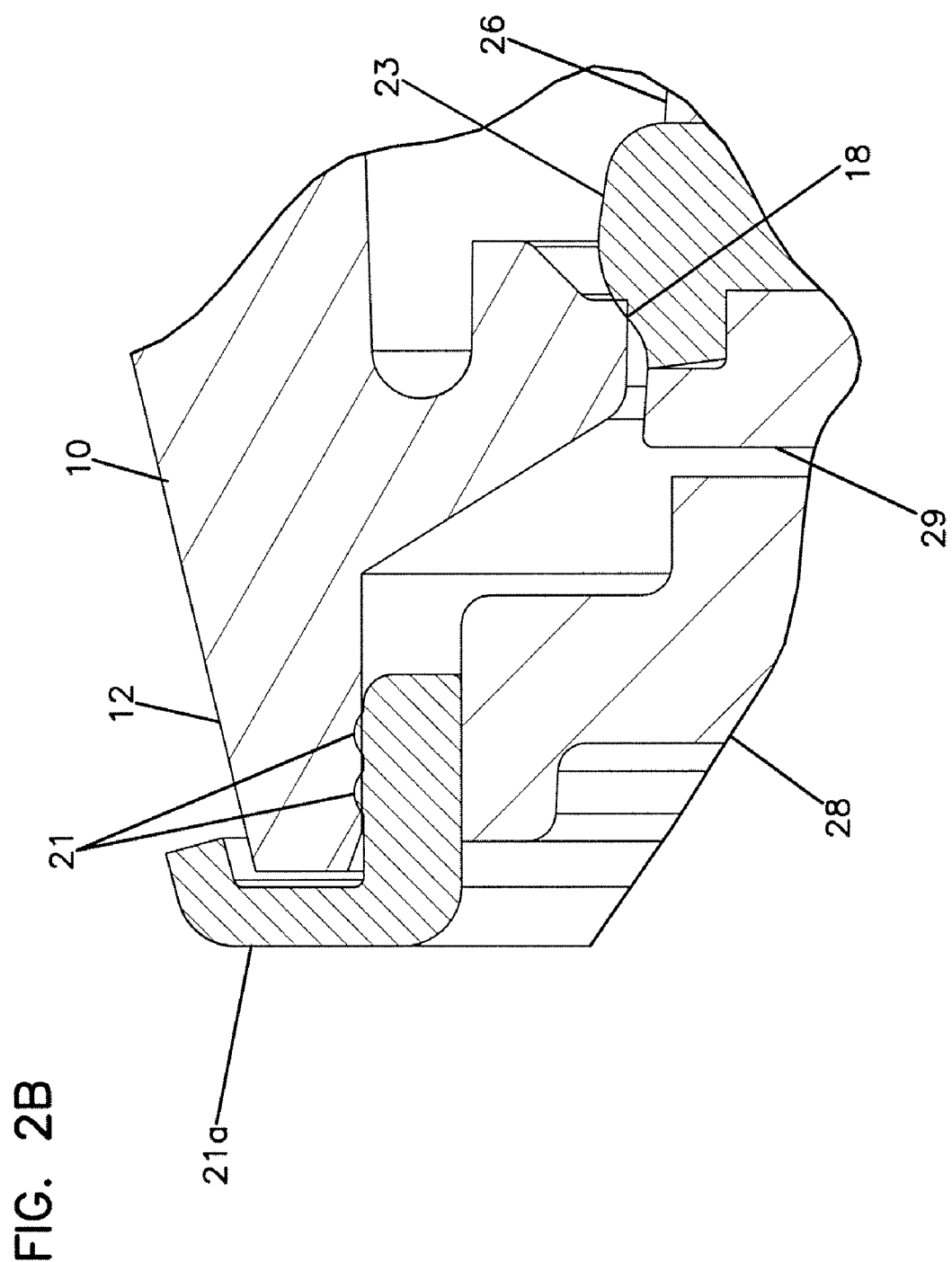
FIG. 2B represents another enlarged partial sectional view of the insert and poppet valve member from Detail A of FIG. 2A.

As shown in FIGS. 1, 2A, and 2B, the removable cover portion 28 provides a cap-like structure so as to cover the end 12 of the insert 10. The removable cover portion 28 includes a handle structure 22a extending longitudinally outward from the cover portion 28. The handle structure 22a extends out of the first end 22 of the poppet valve member 20, and can project out from the end 12 of the insert 10. The handle structure 22a can define oppositely disposed tabs, such that an end user can grasp and remove the cover portion 28 from the poppet valve member 20. The handle structure 22a can be twisted so as to allow the cover portion 28 to be removed from the first end 22.

Proximate the first end 22, a head portion 29 is disposed behind the removable cover portion 28. As best shown in FIGS. 2A and 2B, the head portion 29 resides within the flow passage of the insert 10 and within an inner annular sidewall therein. In the example shown, the head portion 29 can include a cylindrical body having a second seal 23 disposed about the outer perimeter or circumference of the body. In the example shown, the head portion 29 includes a diameter less than a diameter of the inner flow passage of the insert 10. As typically employed, a poppet valve such as poppet valve member 20 reciprocates within a flow passage of the insert 10, so as to open and close the flow passage and respectively enable/disable fluid flow therethrough.

The second seal 23 contacts a portion of the insert 10 so as to seal the flow passage and disable fluid flow between the ends 12, 14 of the insert 10. As best shown in FIGS. 2A and 2B, the second seal 23 contacts with an inner portion 18 of the insert 10. The inner portion 18 can be a shoulder or barb-like inner protrusion. It will be appreciated, however, that these configurations are examples only and that other structures may be employed that are equally suitable. It will be appreciated that the circumference geometries can be varied as desired with respect to the head portion and insert used, and may be adapted so as to be configured of geometries other than an insert with a circular flow path and circular head.

An elongated body 26 longitudinally extends from the head portion 29 toward the second end 24. In the example shown, the elongated body 26 defines a width significantly smaller than a flow passage of the insert 10. Thus, the elongated body 26 includes a width that is less than the diameter defined by the head portion 29.

Figure 7:
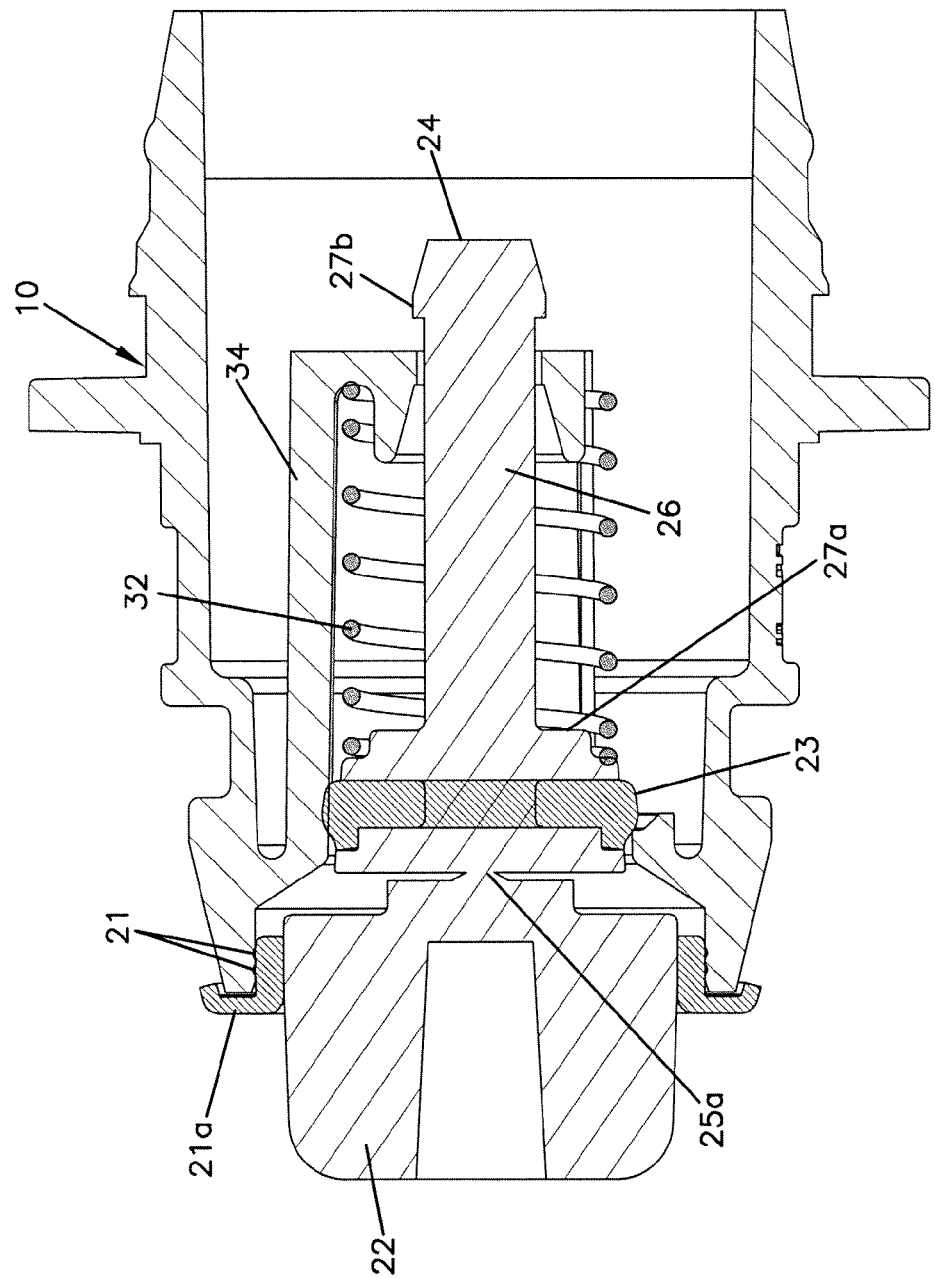
FIG. 7 represents a section side view of the poppet valve member of FIG. 5A incorporated into a coupler insert.

A shoulder portion 27a is disposed on the elongated body 26. In the example shown, shoulder portion 27a is disposed proximate the head portion 29. As shown, four shoulder portions are illustrated for shoulder portions 27a. This configuration, however, is merely one embodiment, as other configurations can be employed, such as, but not limited to, more or fewer shoulder portions. Shoulder portion 27a provides a surface for a biasing member 32 (see FIG. 7) to be disposed about the elongated body, where such biasing member 32 is moveable along the elongated body 26.

A biasing member can be, but is not limited to, a coiled spring. Such biasing members are well known in that they are typically a separate part from the elongated body 26.

A retaining structure can be employed to movably connect the poppet valve member 20 to a support structure 34 (see FIG. 7) within the insert 10. Such a support structure 34 can be employed within the insert housing to retain the poppet valve member 20, while enabling reciprocating action of the poppet valve member 20 (using biasing member 32) within the insert 10. The retaining structure can be a retaining barb 27b. Retaining barb 27b is employed to snap the poppet valve member 20 into place with support structure 34 provided by the insert 10. In this connection, the elongated body 26 can slidingly move within the insert 10. The retaining barb 27b is disposed at the second end of the main body 37 of the poppet member valve 20. Namely, the retaining barb 27b is at an end of the elongated body 26 opposite the shoulder portion 27a. Such a configuration typically provides the open and close mechanism for the insert 10. Poppet valve support structures for an insert are well known.

The cover portion 28 is removable from the remainder of the poppet valve member 20. A webbing portion 25 can be employed so as to allow the cover portion 28 to be removed by an end user. The webbing portion 25 is disposed between the cover portion 28 and the head portion 29. An end user can employ the handle structure 22a to twist off the cover portion 28, thereby exposing the head portion 29. Once the cover portion 28 has been removed, the poppet valve member 20 with the head portion 29 and elongated body 26 are movable within the flow passage of the insert 10. Namely, after the cover portion 28 has been removed and when the insert 10 is connected to a mating coupler, such as a quick connect/disconnect coupling, the insert 10 can be activated and deactivated for fluid dispensing.

Referring now to FIG. 4, one example embodiment of the webbing portion 25 can be defined as a fault-like structure. A void 22b extends from a front end 22 of the removable cover portion 28 through to the head portion 29 of the poppet main body 37. The void 22b can be cylindrical such that the fault-like structure defines a breakable circumferential connection with the head portion 29. Thus, the webbing portion 25 allows the removable cover portion 28 to be broken off and removed from the head portion 29 and main body 37 such that the head portion 29 is provided with a clean face. In this configuration, contamination at the head portion 29 can further be prevented.

The poppet valve member 20 is formed of a molded plastic material. In one embodiment, the molded plastic material for the poppet valve member including the main body 37 and cover portion 28 is a rigid material such as, but not limited to, polypropylene, acetal, or acrylonitrile butadiene styrene ("ABS"). However, the rigid material is not limited to these specific examples, as other materials may also be suitably used. In the example shown, the webbing portion 25 is molded of the same plastic material as the poppet valve member 20. The webbing portion 25, however, is formed as a thin fault-like structure, such that it may be broken by a suitable force applied by an end user when the cover portion 28 needs to be removed.

The first and second seals 21, 23 are formed as an overmold portion. In example embodiments, the first and second seals are a material that is molded over and onto the material used to form the cover portion 28, head portion 29, webbing portion 25 and elongated body 26.

In one embodiment, the first and second seals 21, 23 are an overmolded elastomer material. The overmold elastomer is a softer plastic material than a more rigid plastic material used for the cover 28, head 29, webbing 25, and elongated body 26 of the poppet valve member 20. The material for the overmolded seals can be any pliable/flexible material. In one embodiment, the material for the overmolded seals is a thermoplastic elastomer including, but not limited to, SANTOPRENE manufactured by Advanced Elastomer Systems. Other suitable materials consistent with the physical properties described can also be used.

FIGS. 5A, 5B, 6, and 7 illustrate a second embodiment of a poppet member valve 20A having a webbing portion 25a. The webbing portion 25a can be defined as follows. Void 22b extends from the front end 22 of the removable cover portion 28 toward the head portion 29. The void 22b, however, terminates at a closed portion 22c, such that the void 22b does not extend through the removable cover portion 28 to the head portion 29 of the main body 37. The webbing portion 25a can be a breakable connection disposed between the closed portion 22c of the removable cover 28. The webbing portion 25a can be formed as a section that extends in a converging fashion from the closed portion 22c toward the head portion 29. The webbing portion 25a allows the cover portion 28 to be removed from the poppet main body 37 such that the head portion 29 is provided with a clean face. In this configuration, contamination at the head portion 29 can further be prevented.

Poppet valve members configured as described herein can exhibit one or more advantages. The poppet valve members can provide good sealing characteristics because of the overmold elastomer seals. The overlap seal portion minimizes the need for a tear off foil or other less durable caps typically heat staked to the insert or affixed by an adhesive. The poppet valve members facilitate and maintain sanitary conditions. The cover portion provides a durable structure connected to the head portion and initially molded therewith. The cover portion enables the first seal to suitably contact the end of the insert, thereby sealing the flow passage of the insert.

The overmold seal of the first seal provides a durable seal before and during use in fluid dispensing applications. Such a seal configuration and removable cover structure molded as a one-piece unit provide a poppet valve at reduced cost. The poppet valve member, for example, reduces the need for an additional part to cover and seal the end of the insert, because the removable cover and seals are integrally molded with the main poppet structure. Further, such a configuration provides improved tamper-proof and tamper-evident characteristics, which is desired during transport and before end user operation.

In example applications, the poppet valve members disclosed herein can be used in food and beverage packaging such as, but not limited to, condiments, soda syrup, edible oils, and the like. The poppet valve members can be used in any number of applications where fluid dispensing is desirable and standard disposable dispensing couplings are employed. The poppet valve members can be designed for use in a wide variety of flow parameters and in any number of applications that it can support.

It is noted that, although the poppet valve members are described herein as suited for use in an insert, the poppet valve members can also be suitable for incorporation into any number of coupling devices including, but not limited to, quick connect/disconnect couplings. The poppet valve members can be employed in any number of applications for fluid dispensing system.

The above specification provides a complete description of the composition, manufacture and use of the improved poppet valve member. Since many embodiments can be made without departing from the spirit and scope of the disclosure, the invention resides in the claims hereinafter appended.

What is claimed is:

1. A poppet valve member, comprising:
a main body defining a first end and a second end;
a cover portion disposed at the first end, the cover portion being removable from the main body, the cover portion including a first seal disposed about an outer perimeter defined by the cover portion, the first seal providing an overlap seal about the perimeter of the first end of the main body, the first seal having a curved shape, a first section of the first seal being angled from a second section of the first seal, the first section of the first seal being disposed about the outer perimeter defined by the cover portion to form the overlap seal, and the second section of the first seal being disposed about an area of the cover portion proximate to the first end;
a valve head portion disposed proximate the first end and behind the cover portion, the valve head portion including a second seal disposed about an outer perimeter defined by the head portion; and
a webbing portion disposed between and attached to the cover portion and the valve head portion, the webbing portion connecting the cover portion to the head portion, the webbing portion defining a fault structure so as to enable the cover portion to be removed from the valve head portion such that, once the cover portion is removed, the valve head portion is movable within an insert body.

2. The poppet valve member of claim 1, wherein the main body is formed of a molded material, and the first and second seals are formed of an overmold material molded onto the main body, the overmold material being softer than the material forming the main body.

3. The poppet valve member of claim 1, wherein the molded material of the main body includes polypropylene, acetal, or acrylonitrile butadiene styrene.

4. The poppet valve member of claim 1, wherein the overmolded material of the first and second seals includes a thermoplastic elastomer.

5. The poppet valve member of claim 1, wherein the webbing portion is formed by a cylindrical void.

6. An insert for a coupling device, the insert comprising:
an insert body defining a first circumferential insert end, an internal diameter defining a flow passage therethrough, and a shoulder formed in the internal diameter of the flow passage;
a spring located in the insert body; and
a poppet valve member axially moveable within the insert body by the spring, the poppet valve member including:
a main body defining a first end and a second end;
a cover portion disposed at the first end, the cover portion being removable from the main body, the cover portion including a first seal disposed about an outer perimeter defined by the cover portion and sized to engage the first circumferential insert end, the first seal providing an overlap seal about the first circumferential insert end, the first seal having a curved shape, a first section of the first seal being angled from a second section of the first seal, the first section of the first seal being disposed about the outer perimeter defined by the cover portion to form the overlap seal, and the second section of the first seal being disposed about an area of the cover portion proximate to the first end;
a valve head portion disposed proximate the first end and behind the cover portion, the valve head portion including a second seal disposed about an outer perimeter defined by the valve head portion and sized to engage a shoulder formed in the internal diameter of the flow passage of the insert; and
a webbing portion disposed between and attached to the cover portion and the valve head portion, the webbing portion connecting the cover portion to the valve head portion, the webbing portion defining a fault structure so as to enable the cover portion to be removed from the main body such that, once the cover portion is removed, the valve head portion is movable within the flow passage.

7. The insert of claim 6, wherein the main body of the poppet valve member is formed of a molded material, and the first and second seals are formed of an overmold material molded onto the main body, the overmold material being softer than the material forming the main body.

8. The insert of claim 6, wherein the molded material of the main body includes polypropylene, acetal, or acrylonitrile butadiene styrene.

9. The insert of claim 6, wherein the overmolded material of the first and second seals includes a thermoplastic elastomer.

10. The insert of claim 6, wherein the webbing portion is formed by a cylindrical void.

11. A method of forming a poppet valve member for an insert, the method comprising:
molding a main body including a cover portion and a valve head portion, the cover portion being coupled to the valve head portion by a webbing portion, the webbing portion defining a fault structure so as to enable the valve head portion to be movable within a flow passage formed by the insert once the cover portion is removed from the valve head portion; and
thereafter, overmolding first and second seals on the main body, the first seal being disposed about an outer perimeter defined by the cover portion, the first seal providing an overlap about the outer perimeter and one end of the main body, the first seal being curved so that a first section of the first seal is angled from a second section of the first seal, the first section of the first seal being disposed about the outer perimeter defined by the cover portion to form an overlap seal, and the second section of the first seal being disposed about an area of the cover portion proximate to the first end, and the second seal being disposed about an outer perimeter defined by the valve head portion.

12. The method of claim 11, further comprising:
locating the poppet valve member within the flow passage formed by the insert; allowing the first seal to engage a first circumferential insert end defined by the insert; and
allowing the second seal to engage a shoulder formed in an internal diameter of the flow passage of the insert.

13. The method of claim 12, further comprising twisting the cover portion relative to the valve head portion until the web portion breaks to remove the cover portion from the valve head portion.

14. The method of claim 11, wherein the molded material of the main body includes polypropylene, acetal, or acrylonitrile butadiene styrene.

15. The method of claim 11, wherein the overmolded material of the first and second seals includes a thermoplastic elastomer.

* * * * *